United States Patent
Hou et al.

(10) Patent No.: US 11,117,049 B2
(45) Date of Patent: Sep. 14, 2021

(54) COMPUTER COCKPIT FOR DIFFERENT BODY SHAPES OF USER

(71) Applicant: Acer Incorporated, New Taipei (TW)

(72) Inventors: Chen-Chih Hou, New Taipei (TW);
Chun-Chih Kuo, New Taipei (TW);
An-Cheng Lee, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 213 days.

(21) Appl. No.: 16/369,082

(22) Filed: Mar. 29, 2019

(65) Prior Publication Data
US 2020/0147484 A1    May 14, 2020

(30) Foreign Application Priority Data

Nov. 8, 2018    (TW) .................................. 107139619

(51) Int. Cl.
| | | |
|---|---|---|
| *H04N 7/18* | (2006.01) | |
| *A63F 13/24* | (2014.01) | |
| *H04R 5/02* | (2006.01) | |
| *G06F 3/16* | (2006.01) | |
| *G06F 3/01* | (2006.01) | |

(Continued)

(52) U.S. Cl.
CPC ............ *A63F 13/24* (2014.09); *A63F 13/213* (2014.09); *A63F 13/26* (2014.09); *A63F 13/40* (2014.09); *G06F 3/012* (2013.01); *G06F 3/165* (2013.01); *G06T 7/60* (2013.01); *H04N 5/247* (2013.01);
(Continued)

(58) Field of Classification Search
CPC ........ A63F 13/24; A63F 13/213; A63F 13/26; A63F 13/40; A63F 13/90; A63F 13/98; H04R 5/023; G06F 3/165; G06F 3/012; H04N 5/247; H04N 5/232; G06T 7/60;
(Continued)

(56) References Cited

U.S. PATENT DOCUMENTS

| | | | |
|---|---|---|---|
| 6,748,325 B1 * | 6/2004 | Fujisaki ................. | G01C 21/00 701/301 |
| 10,126,720 B2 * | 11/2018 | Liu ..................... | F16M 11/2085 |

(Continued)

FOREIGN PATENT DOCUMENTS

| | | |
|---|---|---|
| JP | 2008-173998 A | 7/2008 |
| TW | 201607463 A | 3/2016 |

OTHER PUBLICATIONS

Foxlin et al, FlightTracker A novel optical/inertial tracker for cockpit enhancement vision (Year: 2004).*

(Continued)

*Primary Examiner* — Shan E Elahi
(74) *Attorney, Agent, or Firm* — McClure, Qualey & Rodack, LLP

(57) ABSTRACT

A computer cockpit for interacting with a user includes a front camera, a back camera, a display device, a microprocessor, a chair, and a controller. The front camera or the back camera captures an image of the user. The display device generates a display image according to the image. The microprocessor analyzes the display image on the display device, so as to obtain height information of the user. The microprocessor generates a first control signal according to the height information. The chair includes a cushion and a backrest connected to the cushion. The controller adjusts a first tilt angle of the backrest according to the first control signal.

19 Claims, 14 Drawing Sheets

(51) Int. Cl.
*H04N 5/247* (2006.01)
*A63F 13/213* (2014.01)
*A63F 13/26* (2014.01)
*A63F 13/40* (2014.01)
*G06T 7/60* (2017.01)

(52) U.S. Cl.
CPC .... *H04R 5/023* (2013.01); *G06T 2207/30196* (2013.01)

(58) Field of Classification Search
CPC .......... G06T 2207/30196; H04S 7/304; H04S 2400/13
USPC .......................................... 348/77
See application file for complete search history.

(56) References Cited

U.S. PATENT DOCUMENTS

2017/0348180 A1* 12/2017 Inada ................... A61H 23/006
2018/0185215 A1* 7/2018 Brown ................. A61G 5/1067
2019/0182415 A1* 6/2019 Sivan ...................... G06F 3/013

OTHER PUBLICATIONS

Read III et al, Developing the next generation cockpit display system (Year: 1996).*
Foxlin et al, FlightTracker: A novel optical/inertial tracker for cockpit enhanced vision (Year: 2004).*
Read et al, Developing the next generation cockpit display system (Year: 1996).*
Chinese language office action dated May 7, 2019, issued in application No. TW 107139619.

* cited by examiner

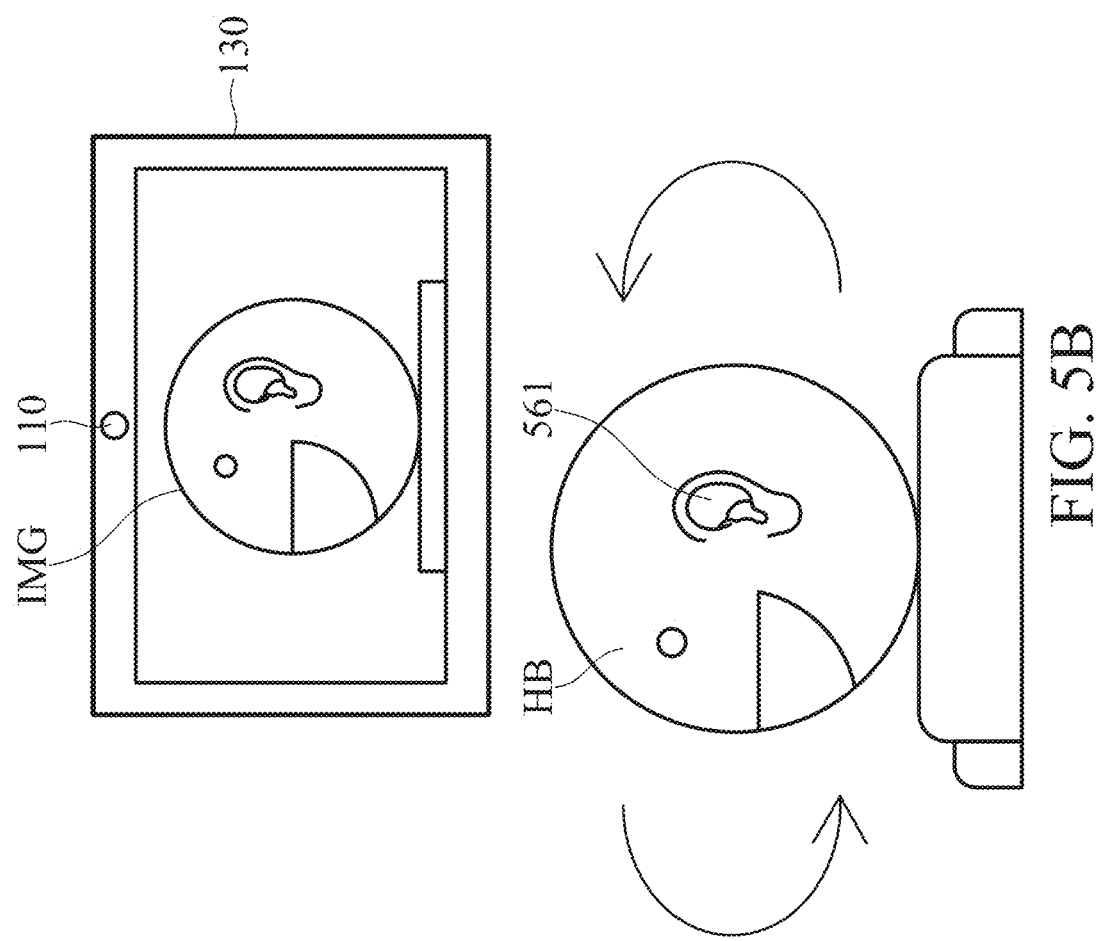

COMPUTER COCKPIT FOR DIFFERENT BODY SHAPES OF USER

CROSS REFERENCE TO RELATED APPLICATIONS

This Application claims priority of Taiwan Patent Application No. 107139619 filed on Nov. 8, 2018, the entirety of which is incorporated by reference herein.

BACKGROUND OF THE INVENTION

Field of the Invention

The disclosure relates in general to a computer cockpit, and in particular to a computer cockpit that can be used by a variety of users of different body shapes.

Description of the Related Art

With the development of gaming, users request comfortable environments when playing games. However, players have different body shapes, and current single-size cockpits cannot meet all of the requirements of users. Accordingly, there is a need to propose a novel solution for solving the problem of the prior art.

BRIEF SUMMARY OF THE INVENTION

In a preferred embodiment, the invention is directed to a computer cockpit for interacting with a user. The computer cockpit includes a front camera, a back camera, a display device, a microprocessor, a chair, and a controller. The front camera or the back camera captures an image of the user. The display device generates a display image according to the image. The microprocessor analyzes the display image on the display device, so as to obtain height information of the user. The microprocessor generates a first control signal according to the height information. The chair includes a cushion and a backrest connected to the cushion. The controller adjusts the first tilt angle of the backrest according to the first control signal.

In some embodiments, the front camera and the back camera are disposed on the display device.

In some embodiments, the computer cockpit further includes a light source disposed on the display device. The light source generates a projection light so as to form a light spot on the ground. When the user stands on the light spot, the back camera captures the image of the user.

In some embodiments, if the image of the user is captured by the back camera, the height information will be relative to a full body height of the user.

In some embodiments, the angle between the backrest and the cushion is equal to the sum of a first fixed angle and the first tilt angle. The first fixed angle is equal to 90 degrees.

In some embodiments, if the full body height of the user increases, the first tilt angle will becomes larger. If the full body height of the user decreases, the first tilt angle will become smaller.

In some embodiments, the chair further includes a footrest connected to the cushion. The microprocessor further generates a second control signal according to the height information. The controller adjusts a second tilt angle of the footrest according to the second control signal.

In some embodiments, the angle between the footrest and the cushion is equal to the sum of a second fixed angle and the second tilt angle. The second fixed angle is equal to 90 degrees.

In some embodiments, if the full body height of the user increases, the second tilt angle will become larger. If the full body height of the user decreases, the second tilt angle will become smaller.

In some embodiments, if the image of the user is captured by the front camera, the height information will be relative to an upper body height of the user.

In some embodiments, the chair further includes a headrest connected to the backrest. The microprocessor further generates a third control signal according to the height information. The controller adjusts an adjustable distance between the headrest and the cushion.

In some embodiments, if the upper body height of the user increases, the adjustable distance will become longer. If the upper body height of the user decreases, the adjustable distance will become shorter.

In some embodiments, the chair further includes a headphone which includes a left channel and a right channel. The left channel and the right channel are embedded in the headrest.

In some embodiments, the front camera detects whether the head of the user turns left or right. The microprocessor controls the output state of the headphone according to the detection result of the front camera.

In some embodiments, when the head of the user turns left, output sound volume of the left channel becomes lower and output sound volume of the right channel becomes higher. When the head of the user turns right, the output sound volume of the left channel becomes higher and the output sound volume of the right channel becomes lower.

In some embodiments, the microprocessor is positioned under the cushion or behind the backrest.

In some embodiments, the microprocessor is coupled to the display device and the controller in a wireless way.

In some embodiments, the controller includes a motor and an actuator, so as to fine-tune a movement state or a rotation state of the backrest.

In some embodiments, when the head of the user turns left, the output sound volume of the left channel becomes a standard value minus a difference value, and the output sound volume of the right channel becomes the standard value plus the difference value.

In some embodiments, when the head of the user turns right, the output sound volume of the left channel becomes a standard value plus a difference value, and the output sound volume of the right channel becomes the standard value minus the difference value.

BRIEF DESCRIPTION OF DRAWINGS

The invention can be more fully understood by reading the subsequent detailed description and examples with references made to the accompanying drawings, wherein:

FIG. 5B is a diagram of a user whose head turns left according to another embodiment of the invention.

DETAILED DESCRIPTION OF THE INVENTION

In order to illustrate the foregoing and other purposes, features and advantages of the invention, the embodiments and figures of the invention will be described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1A:
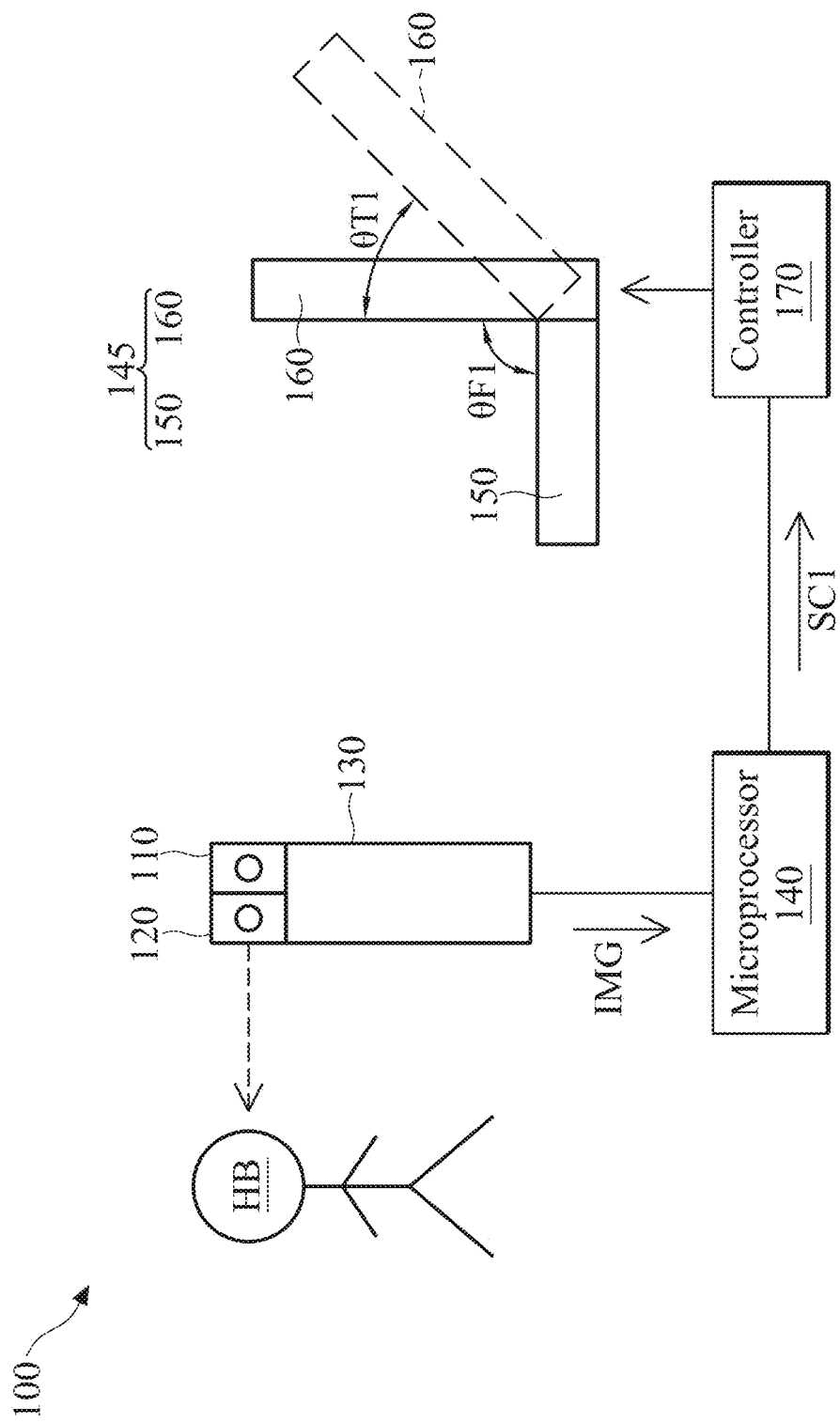
FIG. 1A is a diagram of a computer cockpit according to an embodiment of the invention.
Figure 1B:
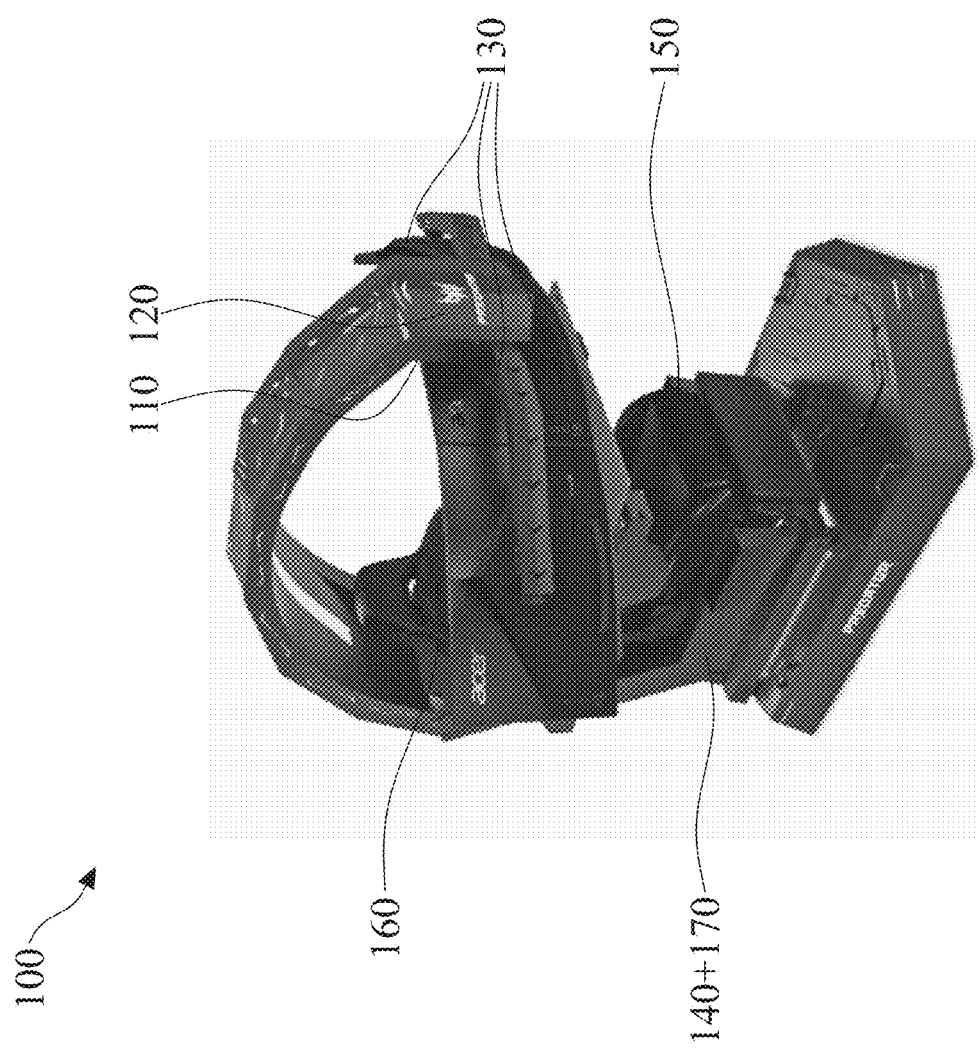
FIG. 1B is a perspective view of a computer cockpit according to an embodiment of the invention.

FIG. 1A is a diagram of a computer cockpit 100 according to an embodiment of the invention. FIG. 1B is a perspective view of the computer cockpit 100 according to an embodiment of the invention. Please refer to FIG. 1A and FIG. 1B together. It should be understood that FIG. 1B embodies the block elements of FIG. 1A; however, in fact, the internal design and the external style of the computer cockpit 100 are not limited in the invention. The computer cockpit 100 can interact with a user HB. For example, the user HB may enter the inner space of the computer cockpit 100 and play a variety of gaming, so as to enjoy an immersive virtual reality environment.

In the embodiment of FIG. 1A and FIG. 1B, the computer cockpit 100 includes a front camera 110, a back camera 120, a display device 130, a microprocessor 140, a chair 145, and a controller 170. The computer cockpit 100 may further include other optional components, such as a base, a supporting element, a storage device and/or an infrared detector, although they are not displayed in FIG. 1A and FIG. 1B.

The front camera 110 and the back camera 120 are opposite to each other. In some embodiments, the front camera 110 and the back camera 120 are both disposed on an edge of the display device 130. The front camera 110 or the back camera 120 can capture an image of the user HB. For example, when the user HB sits in front of the display device 130, the front camera 110 can capture an upper body image of the user HB, and when the user HB stands in back of the display device 130, the back camera 120 can capture a full body image of the user HB. It should be noted that the so-called "in front of the display device 130" is generally referred to the inner space of the computer cockpit 100, and the so-called "in back of the display device 130" is generally referred to the outer space of the computer cockpit 100.

The display device 130 is coupled to the front camera 110 and the back camera 120. The display device 130 generates a display image IMG according to the image of the user HB. In some embodiments, the display device 130 includes a plurality of pixels, and these pixels may form the display image IMG which has the same profile as the user HB. The microprocessor 140 is coupled to the display device 130. The microprocessor 140 may include a processing core and a memory device (not shown). The microprocessor 140 analyzes the display image IMG on the display device 130, so as to obtain the height information of the user HB. For example, the microprocessor 140 can estimate the real height of the user HB by counting the number of pixels corresponding to the height of the display image IMG. In some embodiments, the microprocessor 140 is integrated with the other portions of the computer cockpit 100. For example, the microprocessor 140 may be positioned under a cushion 150 or behind a backrest 160. In alternative embodiments, the microprocessor 140 is independent of the computer cockpit 100, and the microprocessor 140 is coupled to the display device 130 and the controller 170 in a wired or wireless way.

The chair 145 includes a cushion 150 and a backrest 160. The backrest 160 is connected to the cushion 150. The angle between the backrest 160 and the cushion 150 may be equal to the sum ($\theta F1+\theta T1$) of a first fixed angle $\theta F1$ and a first tilt angle $\theta T1$. The first fixed angle $\theta F1$ may be equal to about 90 degrees. The first tilt angle $\theta T1$ is adjustable according to different requirements. The controller 170 is coupled to the microprocessor 140. In some embodiments, the controller 170 includes a motor and an actuator (not shown), and therefore the controller 170 can fine-tune a movement state or a rotation state of the backrest 160. The microprocessor 140 generates a first control signal SC1 according to the height information of the user HB. The controller 170 adjusts the first tilt angle $\theta T1$ of the backrest 160 according to the first control signal SC1. With such a design, before the user HB enters the computer cockpit 100, the computer cockpit 100 optimizes the angle and position of the backrest 160 according to the body shape condition of the user HB in advance. Therefore, the user HB can have good and comfortable gaming experience during gameplay.

The following embodiments will introduce a variety of configurations of the computer cockpit 100. It should be noted that these figures and descriptions are merely exemplary for comprehension of readers, rather than limitations of the invention.

Figure 2A:
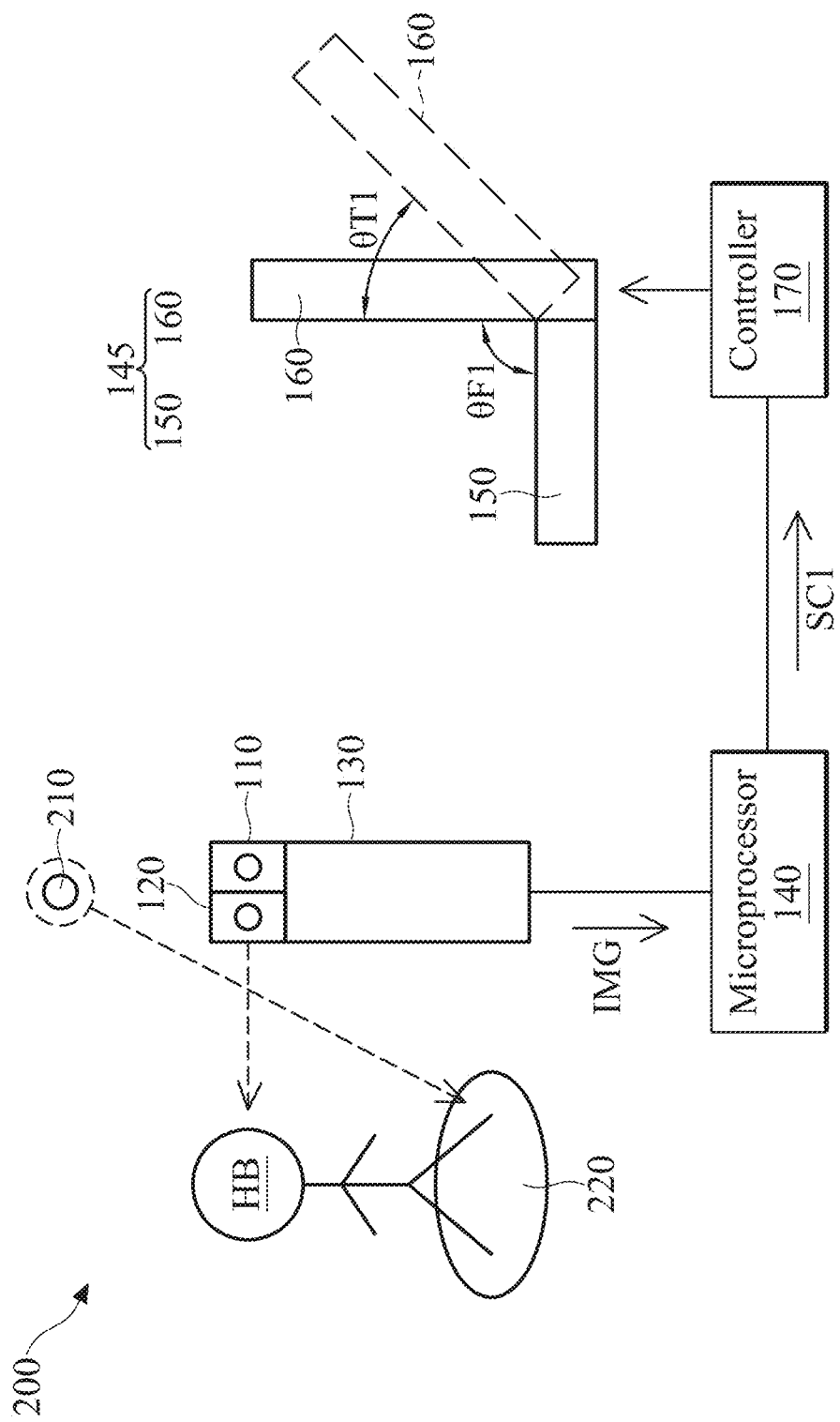
FIG. 2A is a diagram of a computer cockpit according to an embodiment of the invention.
Figure 2B:
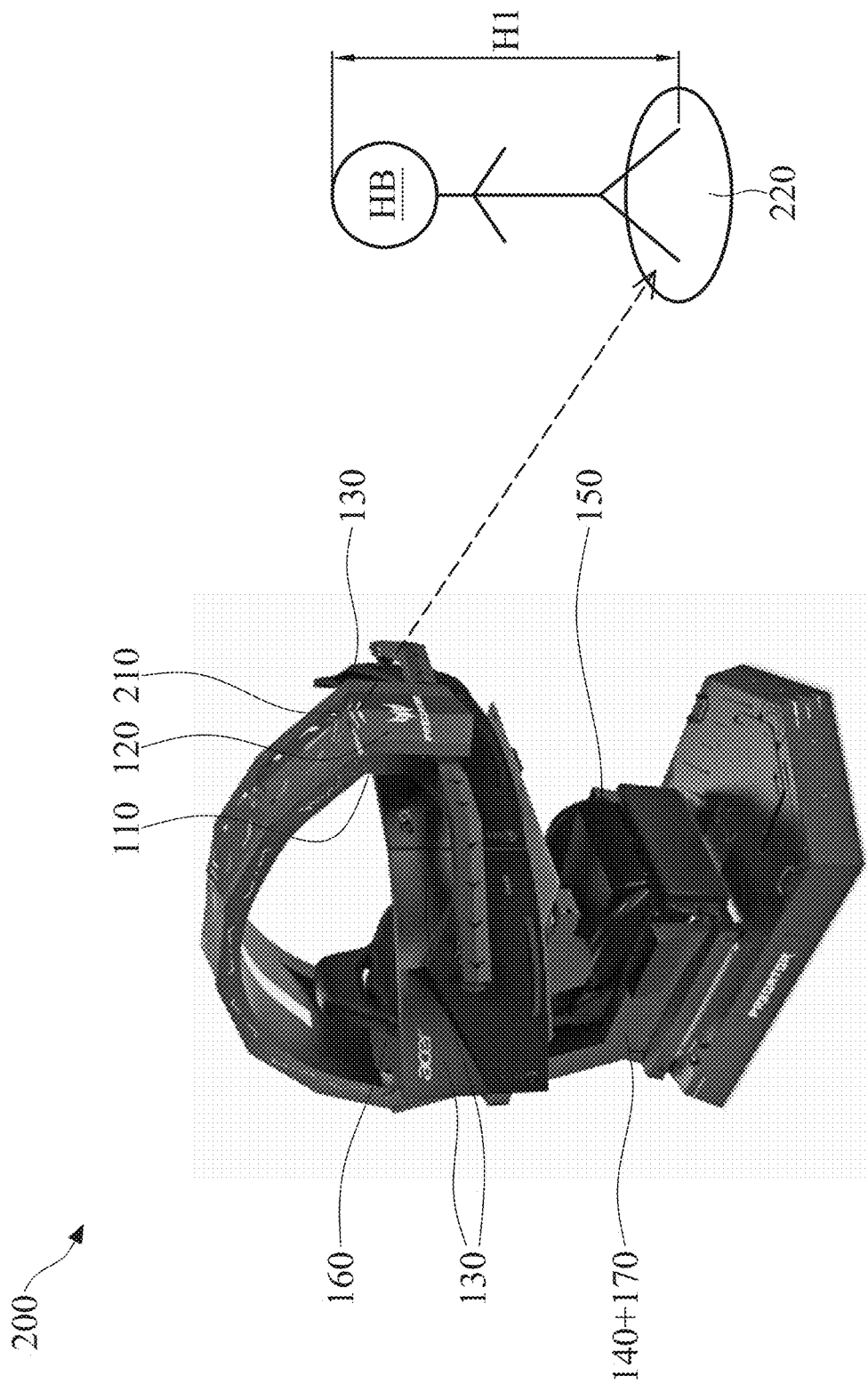
FIG. 2B is a perspective view of a computer cockpit according to an embodiment of the invention.

FIG. 2A is a diagram of a computer cockpit 200 according to an embodiment of the invention. FIG. 2B is a perspective view of the computer cockpit 200 according to an embodiment of the invention. FIG. 2A and FIG. 2B are similar to FIG. 1A and FIG. 1B. In the embodiment of FIG. 2A and FIG. 2B, the computer cockpit 200 further includes a light source 210 disposed on the display device 130. Before the pre-calibration process of the backrest 160 starts, the light source 210 generates a projection light so as to form a light spot 220 on the ground. The light spot 220 may be in back of the display device 130, and it may be used to precisely position the user HB. When the user HB stands on the light spot 220, the user HB may be detected by a proximity sensor (not shown) of the computer cockpit 200, and the back camera 120 can capture the image of the user HB at this time.

Figure 2C:
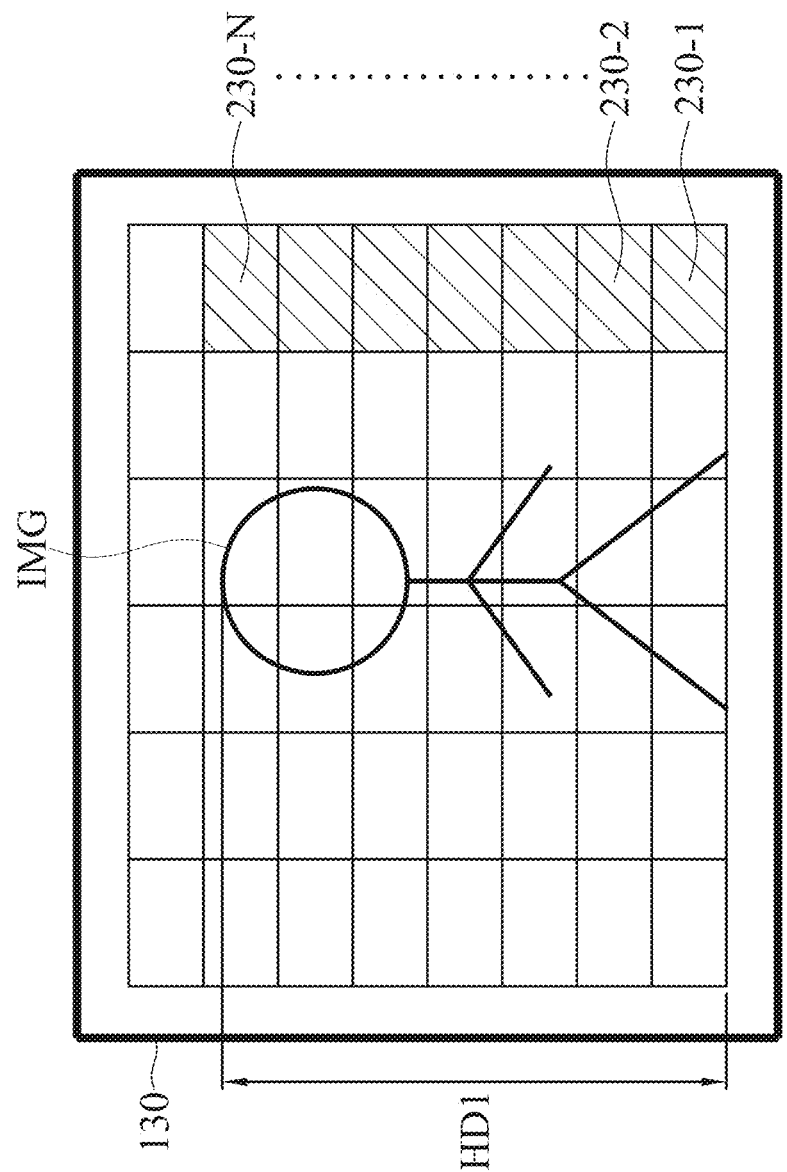
FIG. 2C is a diagram of a display device according to an embodiment of the invention.

FIG. 2C is a diagram of the display device 130 according to an embodiment of the invention. In the embodiment of FIG. 2C, the display device 130 generates the display image IMG according to the image of the user HB. The height HD1 of the display image IMG on the display device 130 may correspond to a portion of pixels 230-1, 230-2, . . . and 230-N ("N" may be a positive integer). For example, the total length of the aforementioned pixels 230-1, 230-2, . . . and 230-N may be substantially equal to the height HD1 of the display image IMG. The microprocessor 140 can estimate the height information of the user HB by counting the number N of pixels 230-1, 230-2, . . . and 230-N. The aforementioned height information may be relative to a full body height H1 of the user HB. The microprocessor 140 can previously store a first mapping table, which recites the relationship between the number N and the full body height H1 of the user HB. For example, if the number N is equal to 70, the microprocessor 140 may determine that the full body height H1 of the user HB is equal to about 140 cm, and if the number N is equal to 80, the microprocessor 140 may determine that the full body height H1 of the user HB is equal to about 160 cm, and so on, but it is not limited thereto.

In some embodiments, the microprocessor 140 further stores a first comparison table, such as the following Table I.

TABLE I

Relationship between First Tilt Angle and Full Body Height of User

| Full Body Height of User | First Tilt Angle |
|---|---|
| Greater than 200 cm | 50 degrees |
| 200 cm | 45 degrees |
| 190 cm | 40 degrees |
| 180 cm | 35 degrees |
| 170 cm | 30 degrees |
| 160 cm | 25 degrees |
| 150 cm | 20 degrees |
| 140 cm | 15 degrees |
| 130 cm | 10 degrees |
| 120 cm | 5 degrees |
| Smaller than 120 cm | 0 degrees |

By looking up the first comparison table according to the full body height H1 of the user HB, the microprocessor 140 and the controller 170 can appropriately select the first tilt angle θT1 of the backrest 160. Generally, if the full body height H1 of the user HB increases (or the user HB is relatively tall), the first tilt angle θT1 of the backrest 160 will become larger, and conversely, if the full body height H1 of the user HB decreases (or the user HB is relatively short), the first tilt angle θT1 of the backrest 160 will become smaller. According to practical measurements, such a design can make the back of the user HB more comfortable. It should be noted that the aforementioned first comparison table is merely exemplary, which is adjustable according to different requirements. Other features of the computer cockpit 200 of FIG. 2A, FIG. 2B, and FIG. 2C are similar to those of the computer cockpit 100 of FIG. 1A and FIG. 1B. Accordingly, the two embodiments can achieve similar levels of performance.

Figure 3A:
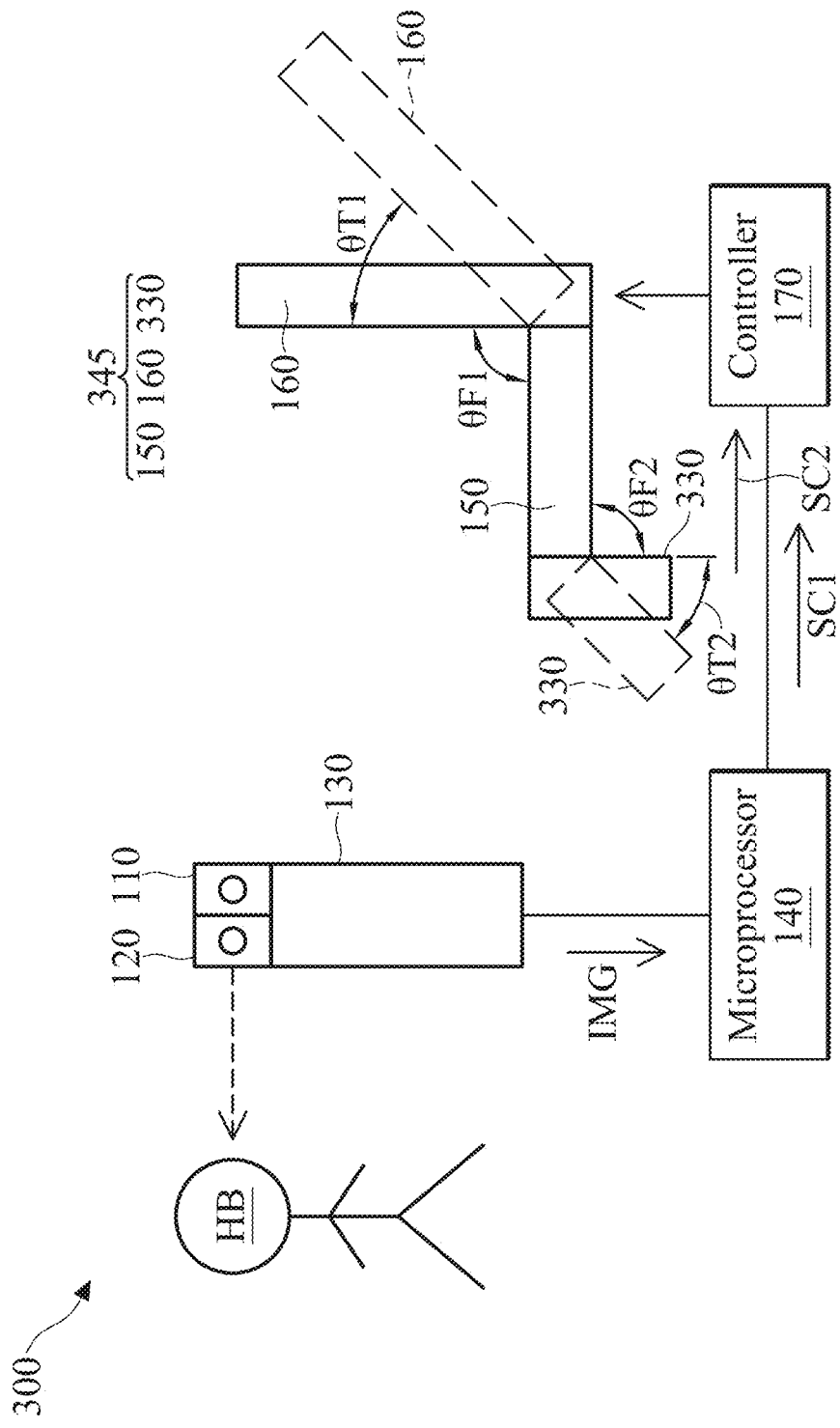
FIG. 3A is a diagram of a computer cockpit according to an embodiment of the invention.
Figure 3B:
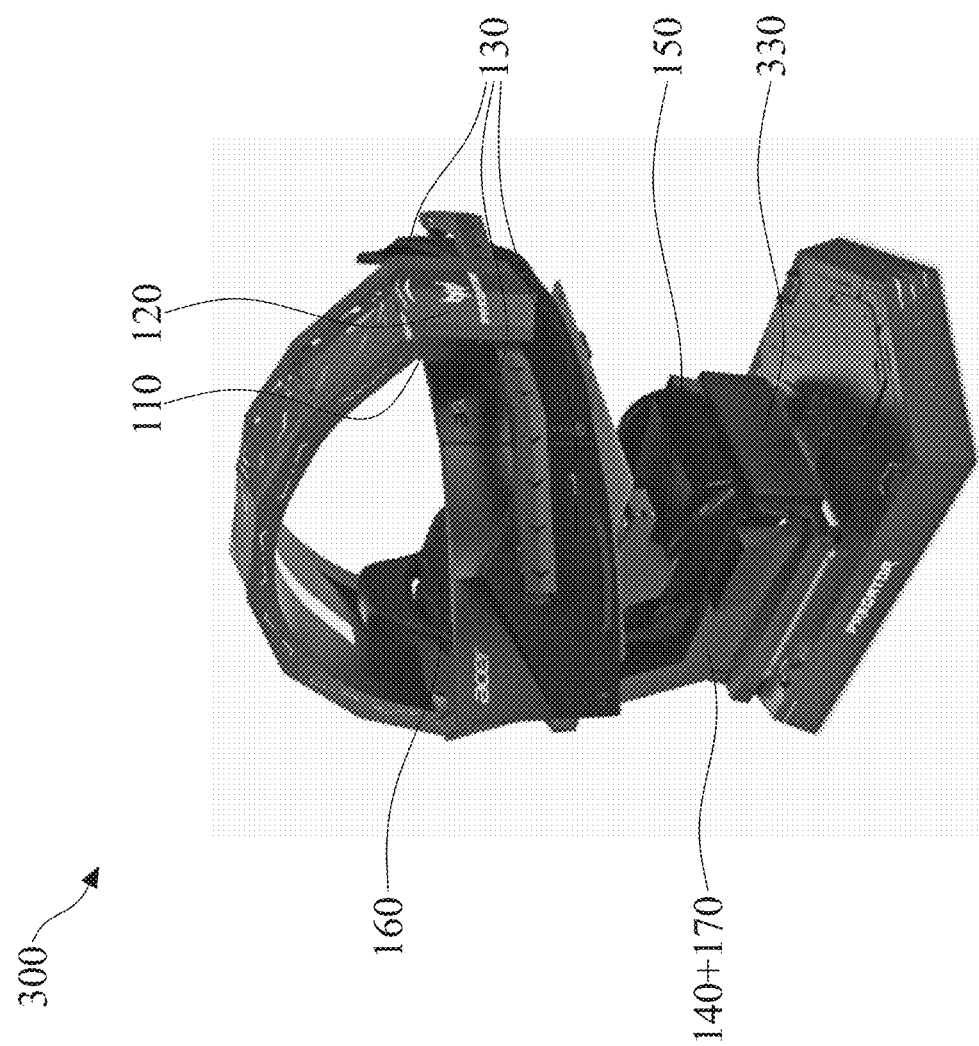
FIG. 3B is a perspective view of a computer cockpit according to an embodiment of the invention.

FIG. 3A is a diagram of a computer cockpit 300 according to an embodiment of the invention. FIG. 3B is a perspective view of the computer cockpit 300 according to an embodiment of the invention. FIG. 3A and FIG. 3B are similar to FIG. 1A and FIG. 1B. In the embodiment of FIG. 3A and FIG. 3B, the chair 345 of the computer cockpit 300 further includes a footrest 330. The footrest 330 is connected to the cushion 150. The angle between the footrest 330 and the cushion 150 may be equal to the sum (θF2+θT2) of a second fixed angle θF2 and a second tilt angle θT2. The second fixed angle θF2 may be equal to about 90 degrees. The second tilt angle θT2 is adjustable according to different requirements. In some embodiments, the controller 170 includes the motor and the actuator, and therefore the controller 170 can fine-tune a movement state or a rotation state of the footrest 330. The microprocessor 140 further generates a second control signal SC2 according to the height information of the user HB. For example, the microprocessor 140 can analyze the display image IMG on the display device 130 so as to obtain the full body height H1 of the user HB, as described in the embodiment of FIG. 2C. The controller 170 adjusts the second tilt angle θT2 of the footrest 330 according to the second control signal SC2. With such a design, before the user HB enters the computer cockpit 300, the computer cockpit 300 optimizes the angle and position of the footrest 330 according to the body shape condition of the user HB in advance. Therefore, the user HB can have good and comfortable gaming experience during gameplay.

In some embodiments, the microprocessor 140 further stores a second comparison table, such as the following Table II.

TABLE II

Relationship between Second Tilt Angle and Full Body Height of User

| Full Body Height of User | Second Tilt Angle |
|---|---|
| Greater than 200 cm | 70 degrees |
| 200 cm | 65 degrees |
| 190 cm | 60 degrees |
| 180 cm | 55 degrees |
| 170 cm | 50 degrees |
| 160 cm | 45 degrees |
| 150 cm | 40 degrees |
| 140 cm | 35 degrees |
| 130 cm | 30 degrees |
| 120 cm | 25 degrees |
| Smaller than 120 cm | 20 degrees |

By looking up the second comparison table according to the full body height H1 of the user HB, the microprocessor 140 and the controller 170 can appropriately select the second tilt angle θT2 of the footrest 330. Generally, if the full body height H1 of the user HB increases (or the user HB is relatively tall), the second tilt angle θT2 of the footrest 330 will become larger, and conversely, if the full body height H1 of the user HB decreases (or the user HB is relatively short), the second tilt angle θT2 of the footrest 330 will become smaller. According to practical measurements, such a design can make the feet of the user HB more comfortable. It should be noted that the aforementioned second comparison table is merely exemplary, which is adjustable according to different requirements. Other features of the computer cockpit 300 of FIG. 3A and FIG. 3B are similar to those of the computer cockpit 100 of FIG. 1A and FIG. 1B. Accordingly, the two embodiments can achieve similar levels of performance.

Figure 4A:
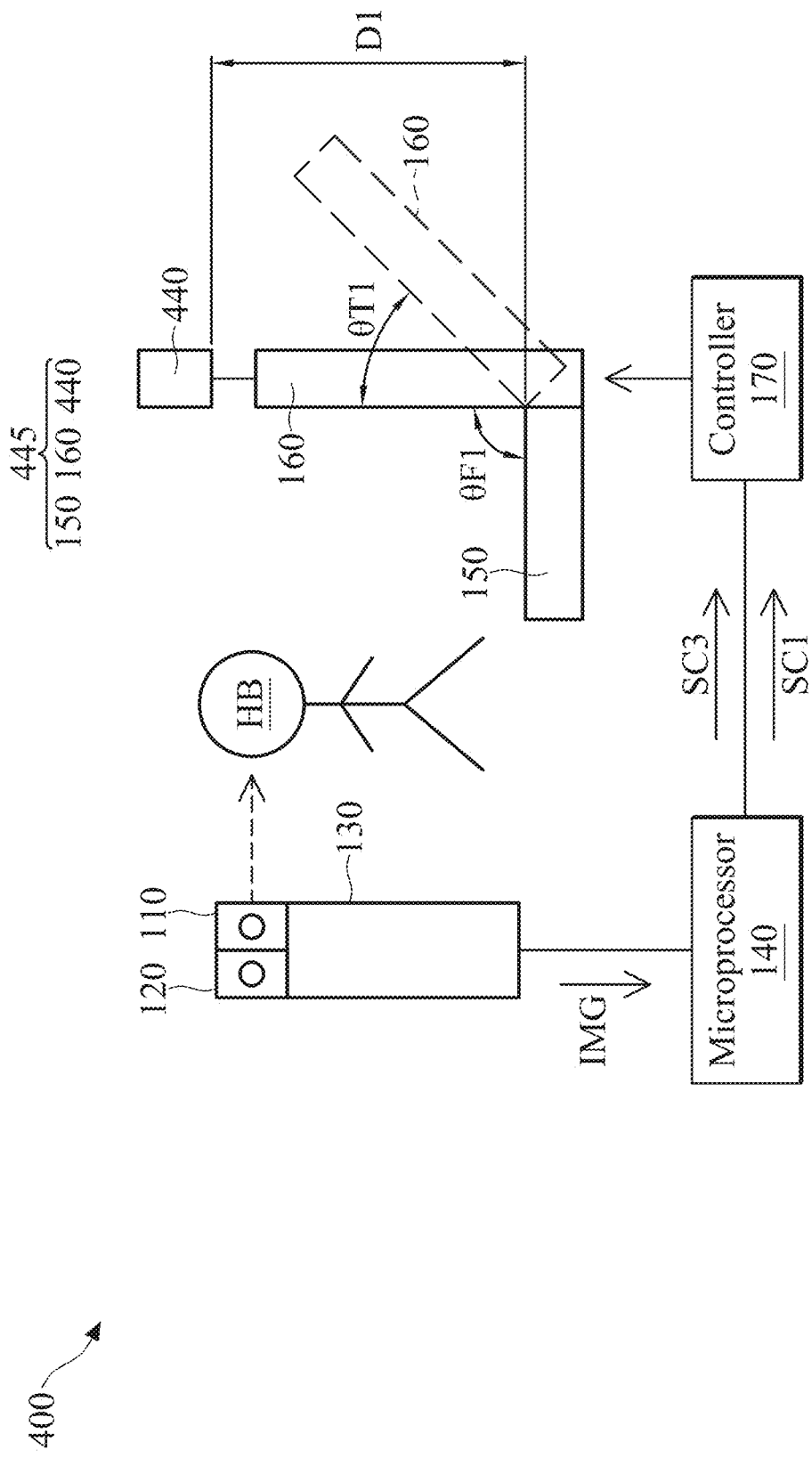
FIG. 4A is a diagram of a computer cockpit according to an embodiment of the invention.
Figure 4B:
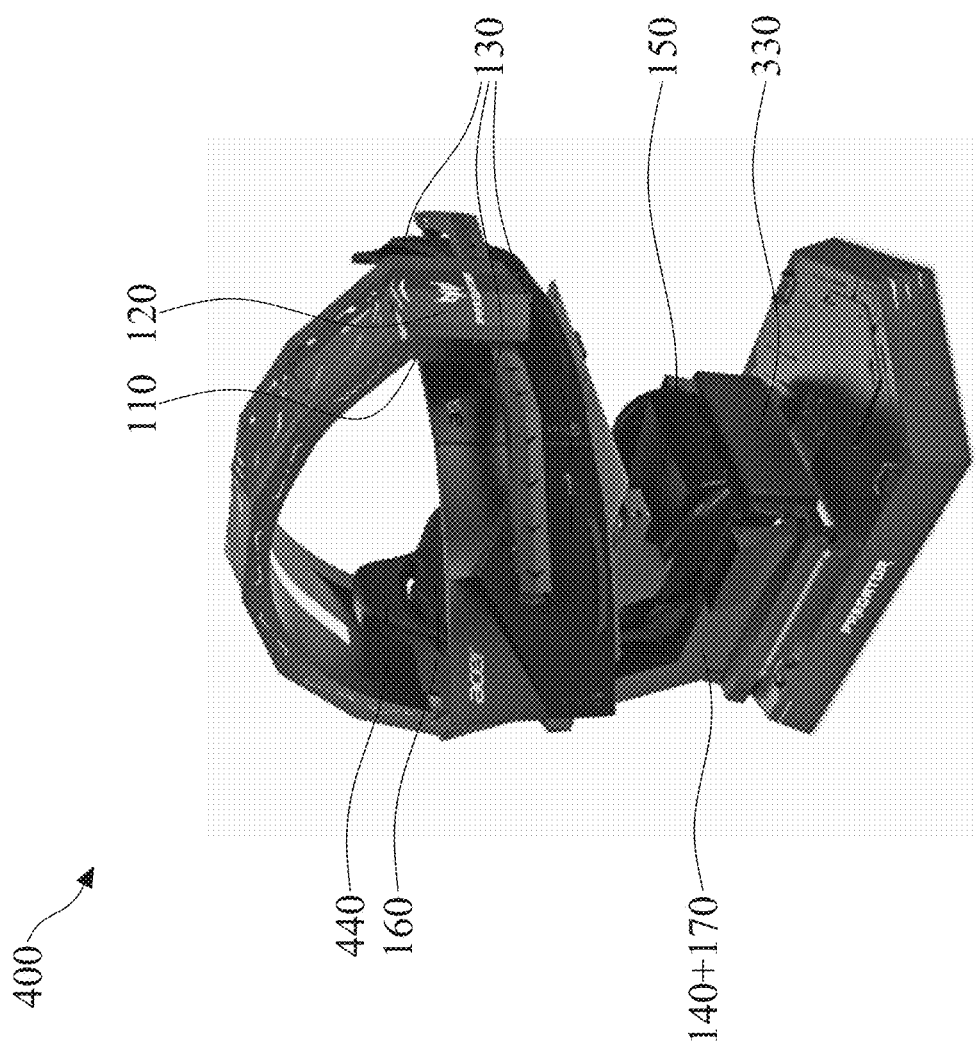
FIG. 4B is a perspective view of a computer cockpit according to an embodiment of the invention.

FIG. 4A is a diagram of a computer cockpit 400 according to an embodiment of the invention. FIG. 4B is a perspective view of the computer cockpit 400 according to an embodiment of the invention. FIG. 4A and FIG. 4B are similar to FIG. 1A and FIG. 1B. In the embodiment of FIG. 4A and FIG. 4B, a chair 445 of the computer cockpit 400 further includes a headrest 440. The headrest 440 is connected to the backrest 160. An adjustable distance D1 is defined between the headrest 440 and the cushion 150. In some embodiments, the controller 170 includes the motor and the actuator, and therefore the controller 170 can fine-tune the height of the headrest 440 on the backrest 160. The microprocessor 140 further generates a third control signal SC3 according to the height information of the user HB. The controller 170 adjusts the adjustable distance D1 between the headrest 440 and the cushion 150 according to the third control signal SC3. With such a design, after the user HB enters the computer cockpit 400, the computer cockpit 400 optimizes the height of the headrest 440 according to the body shape condition of the user HB later. Therefore, the user HB can have good and comfortable gaming experience during gameplay.

Figure 4C:
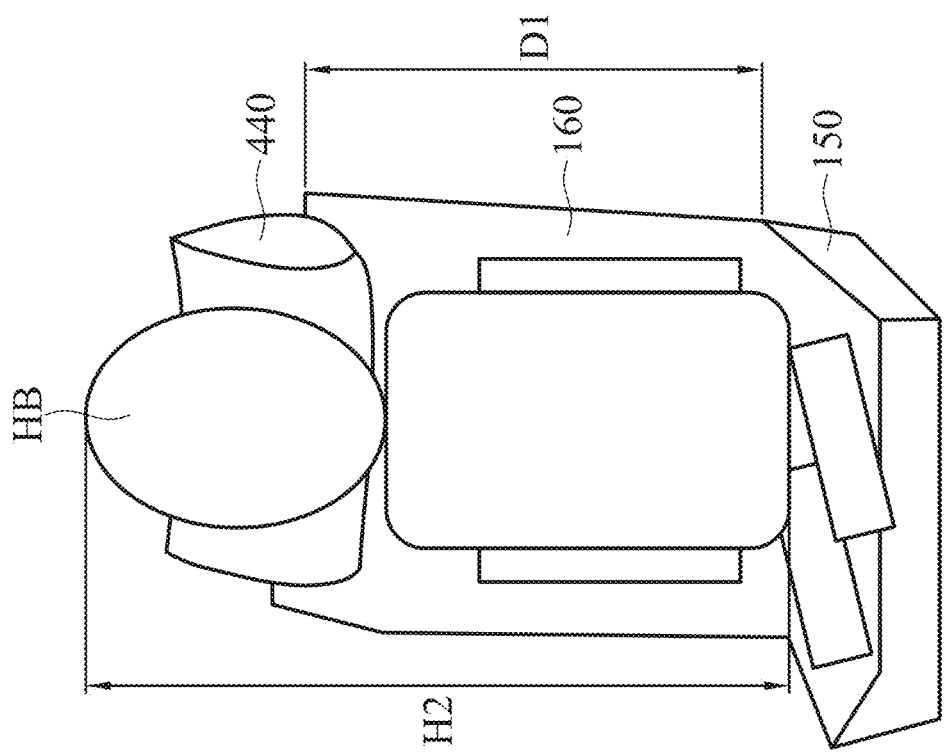
FIG. 4C is a diagram of a user sitting on a cushion according to an embodiment of the invention.
Figure 4D:
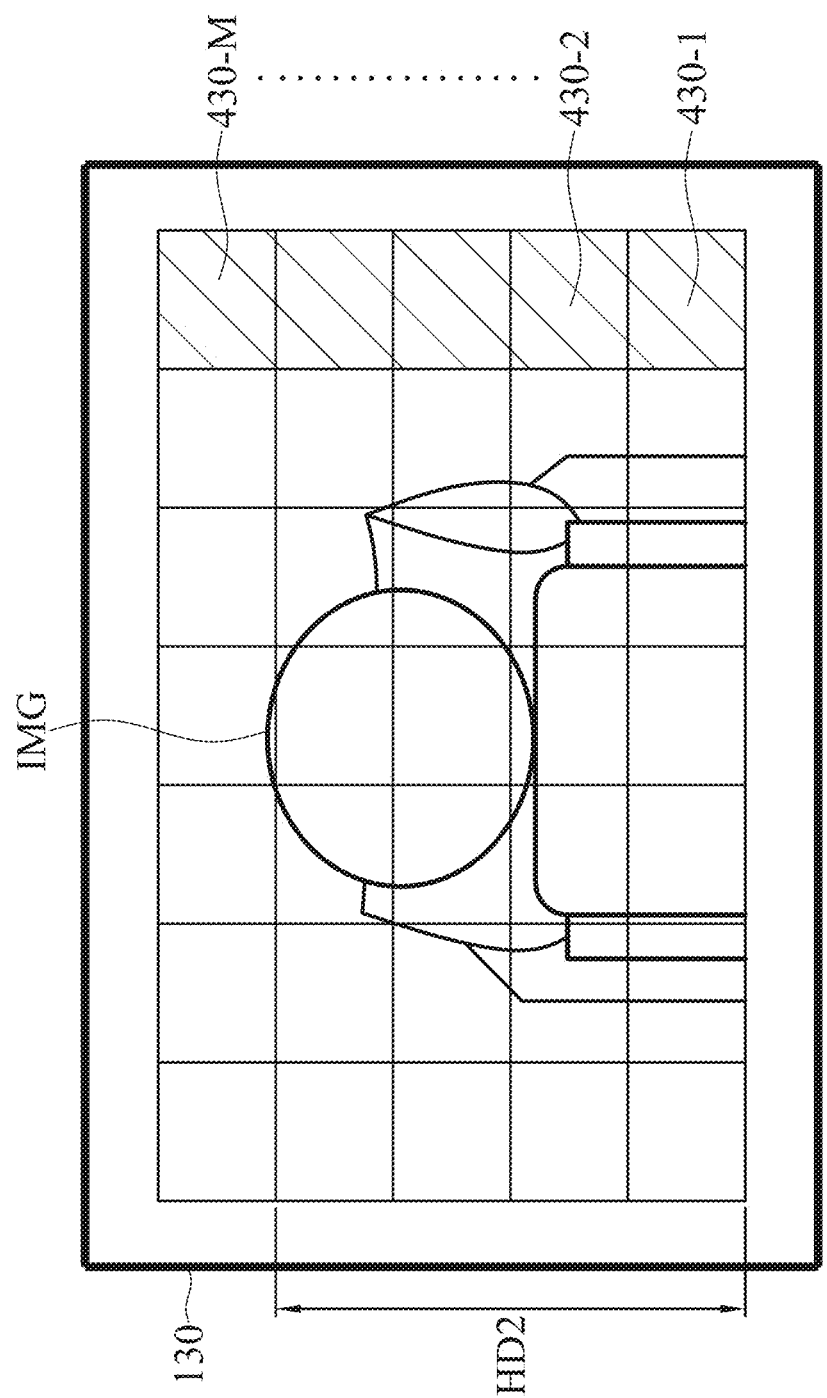
FIG. 4D is a diagram of a display device according to an embodiment of the invention.

FIG. 4C is a diagram of the user HB sitting on the cushion 150 according to an embodiment of the invention. Before the post-calibration process of the headrest 440 starts, the user HB should sit on the cushion 150 in front of the display device 130. The user HB may be detected by a pressure sensor of the computer cockpit 400 (not shown), and the front camera 110 can capture the image of the user HB at this time. FIG. 4D is a diagram of the display device 130 according to an embodiment of the invention. In the embodiment of FIG. 4D, the display device 130 generates the display image IMG according to the image of the user HB. The height HD2 of the display image IMG on the display device 130 may correspond to a portion of pixels 430-1, 430-2, . . . and 430-M ("M" may be a positive integer). For example, the total length of the aforementioned pixels 430-1, 430-2, . . . and 430-M may be substantially equal to the height HD2 of the display image IMG. The microprocessor 140 can estimate the height information of the user HB by counting the number M of pixels 430-1, 430-2, . . . and 430-M. The aforementioned height information may be relative to the upper body height H2 of the user HB (i.e., the distance from the top of the head of the user HB to the cushion 150). The microprocessor 140 can previously store a second mapping table, which recites the relationship between the number M and the upper body height H2 of the user HB. For example, if the number M is equal to 40, the microprocessor 140 may determine that the upper body height H2 of the user HB is equal to about 80 cm, and if the number M is equal to 50, the microprocessor 140 may determine that the upper body height H2 of the user HB is equal to about 100 cm, and so on, but it is not limited thereto. In alternative embodiments, the microprocessor 140 can estimates the upper body height H2 of the user HB by analyzing the display image IMG and the distance between the corresponding chin position of the user HB and the edge of the display device 130.

In some embodiments, the microprocessor 140 further stores a third comparison table, such as the following Table III.

TABLE III

Relationship between Adjustable distance and Upper Body Height of User

| Upper Body Height of User | Adjustable distance |
|---|---|
| Greater than 140 cm | 130 cm |
| 140 cm | 120 cm |
| 130 cm | 110 cm |
| 120 cm | 100 cm |
| 110 cm | 90 cm |
| 100 cm | 80 cm |
| 90 cm | 70 cm |
| Smaller than 90 cm | 60 cm |

By looking up the third comparison table according to the upper body height H2 of the user HB, the microprocessor 140 and the controller 170 can appropriately select the adjustable distance D1 of the headrest 440. Generally, if the upper body height H2 of the user HB increases (or the user HB is relatively tall), the adjustable distance D1 of the headrest 440 will become longer, and conversely, if the upper body height H2 of the user HB decreases (or the user HB is relatively short), the adjustable distance D1 of the headrest 440 will become shorter. According to practical measurements, such a design can make the head of the user HB more comfortable. It should be noted that the aforementioned third comparison table is merely exemplary, which is adjustable according to different requirements. Other features of the computer cockpit 400 of FIG. 4A, FIG. 4B, FIG. 4C, and FIG. 4D are similar to those of the computer cockpit 100 of FIG. 1A and FIG. 1B. Accordingly, the two embodiments can achieve similar levels of performance.

Figure 5A:
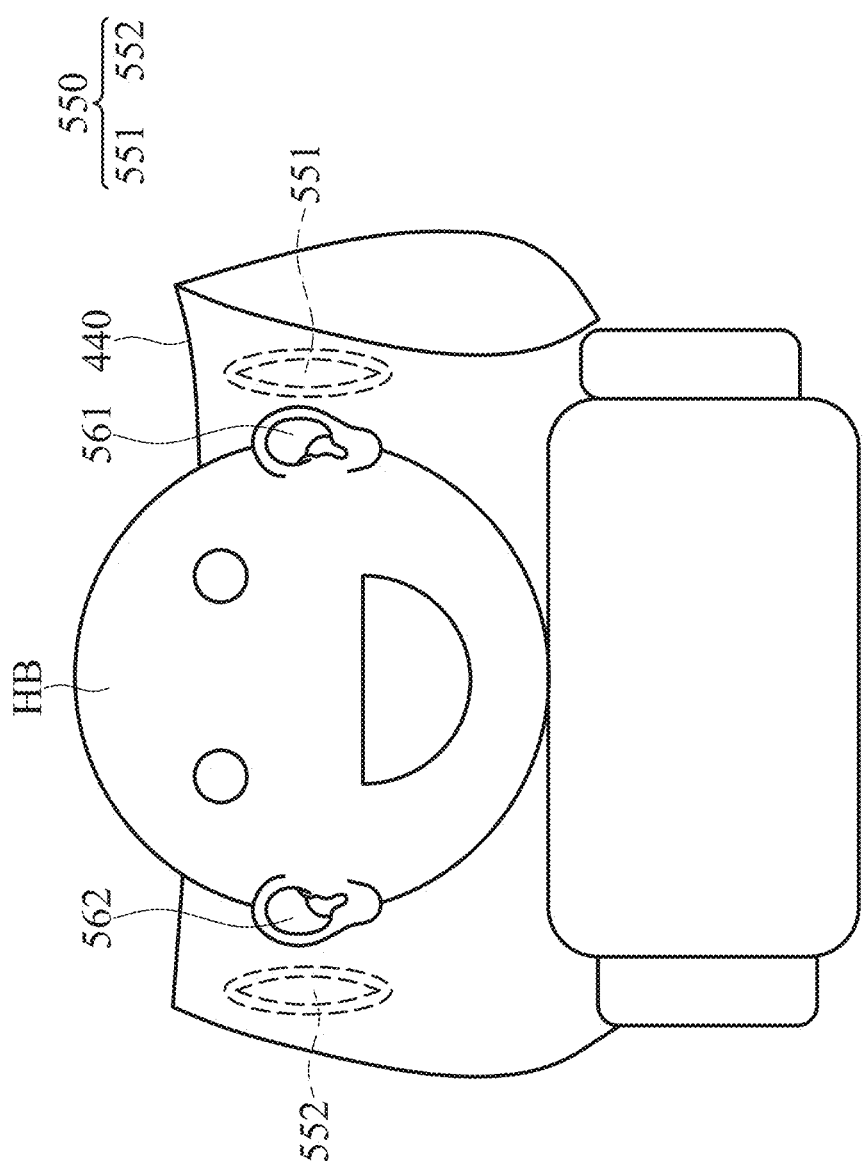
FIG. 5A is a diagram of a user leaning against a headrest according to another embodiment of the invention.

FIG. 5A is a diagram of the user HB leaning against the headrest 440 according to another embodiment of the invention. In the embodiment of FIG. 5A, the chair 445 of the computer cockpit 400 further includes a headphone 550. The headphone 550 is coupled to the microprocessor 140 in a wired or wireless way, and thus signals are transmitted therebetween. The headphone 550 includes a left channel 551 and a right channel 552. Both the left channel 551 and the right channel 552 are embedded in the headrest 440. When the head of the user HB leans against the headrest 440, a left ear 561 of the user HB is adjacent to the left channel 551, and a right ear 562 of the user HB is adjacent to the right channel 552. It should be noted that the term "adjacent" or "close" over the disclosure means that the distance (spacing) between two corresponding elements is smaller than a predetermined distance (e.g., 10 mm or shorter), or means that the two corresponding elements directly touch each other (i.e., the aforementioned distance/spacing therebetween is reduced to 0). When the user HB leans against the headrest 440 in front of the display device 130, the user HB may be detected by the pressure sensor of the computer cockpit 400, and the front camera 110 can capture the image of the user HB at this time. Next, the front camera 110 can further monitor and detect whether the head of the user HB turns left or right, and the microprocessor 140 can control the output state of the headphone 550 according to the detection result of the front camera 110.

Figure 5C:
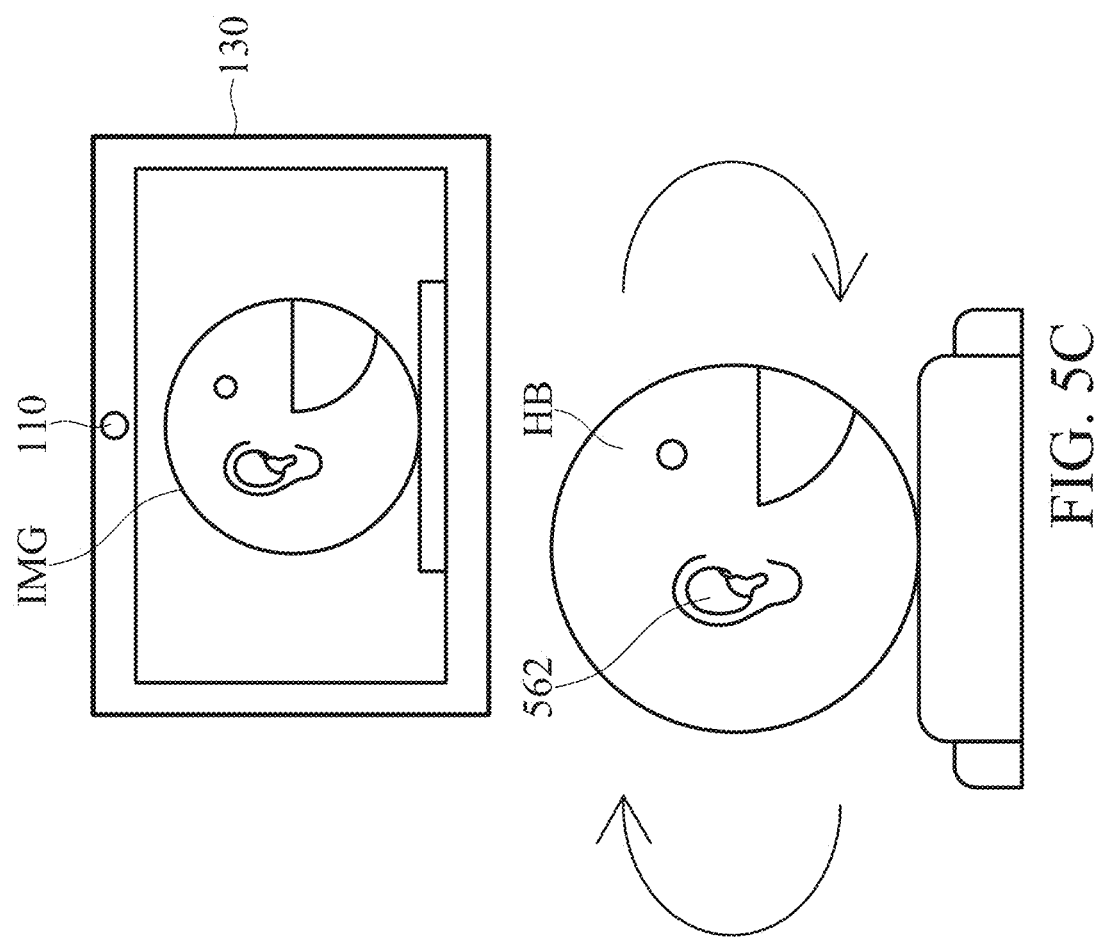
FIG. 5C is a diagram of a user whose head turns right according to another embodiment of the invention.

FIG. 5B is a diagram of the user HB whose head turns left according to another embodiment of the invention. When the front camera 110 detects that the head of the user HB turns left, the microprocessor 140 can control the output sound volume of the left channel 551 to become lower and control the output sound volume of the right channel 552 to become higher. For example, the output sound volume of the left channel 551 may become a standard value minus a difference value, and the output sound volume of the right channel 552 may become the standard value plus the difference value. In some embodiments, the aforementioned difference value is in proportion to a left-turning angle of the head of the user HB. FIG. 5C is a diagram of the user HB whose head turns right according to another embodiment of the invention. When the front camera 110 detects that the head of the user HB turns right, the microprocessor 140 can control the output sound volume of the left channel 551 to become higher and control the output sound volume of the right channel 552 to become lower. For example, the output sound volume of the left channel 551 may become a standard value plus a difference value, and the output sound volume of the right channel 552 may become the standard value minus the difference value. In some embodiments, the aforementioned difference value is in proportion to a right-turning angle of the head of the user HB. According to practical measurements, such a design can make the ears of the user HB more comfortable. After the user HB enters the computer cockpit 400, the computer cockpit 400 optimizes the output state of the headphone 550 in the headrest 440 according to the turning angle of the head of the user HB later. Therefore, the user HB can have good and comfortable gaming experience during gameplay. Other features of the computer cockpit 500 of FIG. 5A, FIG. 5B, and FIG. 5C are similar to those of the computer cockpit 100 of FIG. 1A and FIG. 1B. Accordingly, the two embodiments can achieve similar levels of performance.

The invention proposes a computer cockpit, which can automatically fine-tune the setting values according to relative parameters of a user. For example, the aforementioned setting values may include the first tilt angle of a backrest, a second tilt angle of a footrest, an adjustable distance of a headrest, and output sound volume of a headphone in the headrest, but they are not limited thereto. Therefore, the invention is suitable for application in a variety of gaming industries, so as to improve the user's gaming experience.

Note that the above element parameters are not limitations of the invention. A designer can fine-tune these settings or values according to different requirements. It should be understood that the computer cockpit of the invention is not limited to the configurations of FIGS. 1-5. The invention may include any one or more features of any one or more embodiments of FIGS. 1-5. In other words, not all of the features displayed in the figures should be implemented in the computer cockpit of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. A computer cockpit for interacting with a user, comprising:
    a front camera;
    a back camera, wherein the front camera or the back camera captures an image of the user;
    a display device, generating a display image according to the image;
    a microprocessor, analyzing the display image on the display device so as to obtain height information of the user, wherein the microprocessor generates a first control signal according to the height information;
    a chair, comprising a cushion and a backrest, wherein the backrest is connected to the cushion;
    a controller, adjusting a first tilt angle of the backrest according to the first control signal; and
    a light source, disposed on the display device, and generating a projection light so as to form a light spot on a ground, wherein when the user stands on the light spot, the back camera captures the image of the user.

2. The computer cockpit as claimed in claim 1, wherein the front camera and the back camera are disposed on the display device.

3. The computer cockpit as claimed in claim 1, wherein if the image of the user is captured by the back camera, the height information is relative to a full body height of the user.

4. The computer cockpit as claimed in claim 3, wherein if the full body height of the user increases, the first tilt angle becomes larger, and if the full body height of the user decreases, the first tilt angle becomes smaller.

5. The computer cockpit as claimed in claim 3, wherein the chair further comprises:
    a footrest, connected to the cushion, wherein the microprocessor further generates a second control signal according to the height information, and the controller adjusts a second tilt angle of the footrest according to the second control signal.

6. The computer cockpit as claimed in claim 5, wherein an angle between the footrest and the cushion is equal to a sum of a second fixed angle and the second tilt angle, and the second fixed angle is equal to 90 degrees.

7. The computer cockpit as claimed in claim 5, wherein if the full body height of the user increases, the second tilt angle becomes larger, and if the full body height of the user decreases, the second tilt angle becomes smaller.

8. The computer cockpit as claimed in claim 1, wherein an angle between the backrest and the cushion is equal to a sum of a first fixed angle and the first tilt angle, and the first fixed angle is equal to 90 degrees.

9. The computer cockpit as claimed in claim 1, wherein if the image of the user is captured by the front camera, the height information is relative to an upper body height of the user.

10. The computer cockpit as claimed in claim 9, wherein the chair further comprises:
    a headrest, connected to the backrest, wherein the microprocessor further generates a third control signal according to the height information, and the controller adjusts an adjustable distance between the headrest and the cushion.

11. The computer cockpit as claimed in claim 10, wherein if the upper body height of the user increases, the adjustable distance becomes longer, and if the upper body height of the user decreases, the adjustable distance becomes shorter.

12. The computer cockpit as claimed in claim 10, wherein the chair further comprises:
    a headphone, comprising a left channel and a right channel, wherein the left channel and the right channel are embedded in the headrest.

13. The computer cockpit as claimed in claim 10, wherein the front camera detects whether a head of the user turns left or turns right, and the microprocessor controls an output state of the headphone according to a detection result of the front camera.

14. The computer cockpit as claimed in claim 13, wherein when the head of the user turns left, output sound volume of the left channel becomes lower and output sound volume of the right channel becomes higher, and when the head of the user turns right, the output sound volume of the left channel becomes higher and the output sound volume of the right channel becomes lower.

15. The computer cockpit as claimed in claim 13, wherein when the head of the user turns left, the output sound volume of the left channel becomes a standard value minus a difference value, and the output sound volume of the right channel becomes the standard value plus the difference value.

16. The computer cockpit as claimed in claim 13, wherein when the head of the user turns right, the output sound volume of the left channel becomes a standard value plus a difference value, and the output sound volume of the right channel becomes the standard value minus the difference value.

17. The computer cockpit as claimed in claim 1, wherein the microprocessor is positioned under the cushion or behind the backrest.

18. The computer cockpit as claimed in claim 1, wherein the microprocessor is coupled to the display device and the controller in a wireless way.

19. The computer cockpit as claimed in claim 1, wherein the controller comprises a motor and an actuator, so as to fine-tune a movement state or a rotation state of the backrest.

* * * * *